United States Patent Office 3,437,225
Patented Apr. 8, 1969

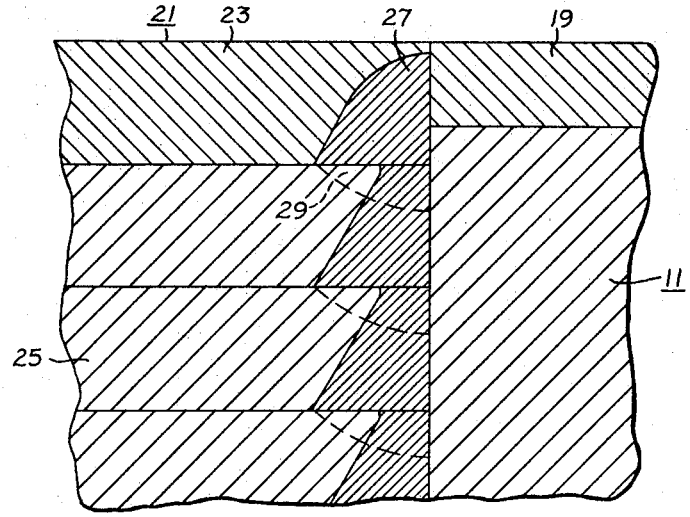
FIG.3.
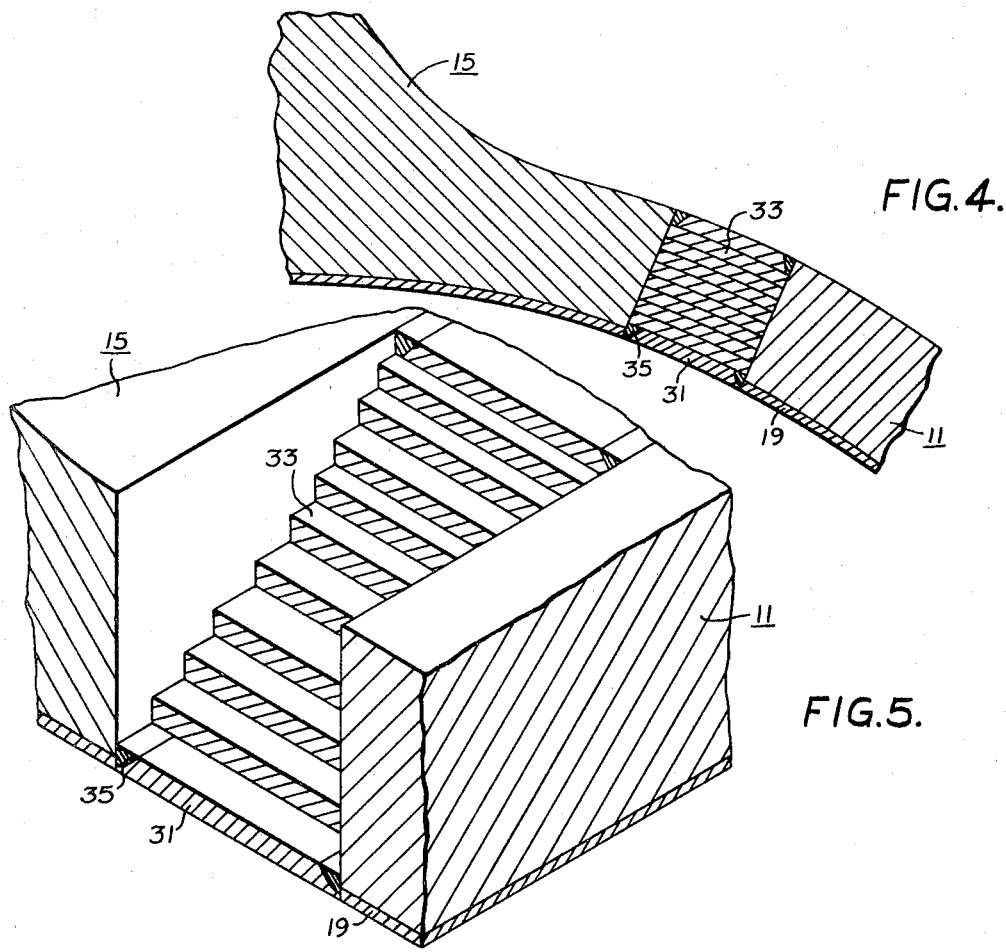
FIG.4.
FIG.5.

3,437,225
WELDED JOINT STRUCTURE FOR HIGH PRESSURE VESSEL
William J. Wachter and Keith V. Smith, Pittsburgh, Pa., assignors to Westinghouse Electric Corporation, Pittsburgh, Pa., a corporation of Pennsylvania
Continuation of application Ser. No. 397,885, Sept. 21, 1964. This application May 3, 1967, Ser. No. 635,928
Int. Cl. F25j 25/00; B65d 7/34, 7/42
U.S. Cl. 220—3   11 Claims

ABSTRACT OF THE DISCLOSURE

A large sectionalized solid vessel with laminated sealed joints (9, FIG. 1) (typically 24 feet in diameter), for the fluid of a high-power generator whose sidewalls 11 are made up of dish or barrel-stave-shaped sections 17. The vessel 9 also has a head 15 and a base 13. The joints between the sections 17 are sealed by a laminated pressure-tight seal composed of thin strips 23 and 25 extending along the length of the sections 17 and perpendicular to the contiguous edges of the sections. At least some of the strips are welded pressure-tight to the contiguous sections. The joints between the wall 11 and the head 15 or base 13 may likewise be sealed by thin strips 31, 33 (FIG. 5) extending around this joint. Typically, the strips 23, 25 or 31, 33 are $\frac{1}{30}$ to $\frac{1}{40}$ of the thickness of the sections.

---

This application is a continuation of application Ser. No. 397,885, filed Sept. 21, 1964, now abandoned.

This invention relates to the art of fabricating vessels and containers and has particular relationship to vessels for containing fluid at high pressures. In its specific aspects, this invention concerns itself with high-power generators which operate with a fluid, for example, water at a high temperature and a high pressure. Typically the water in such a power generator is maintained at a pressure of about 2000 pounds per square inch and at a temperature of 650° to 700° F. The generator is typically enclosed in a vessel which is designed to withstand a pressure of 2500 pounds per square inch and is tested at 3750 pounds per square inch. The fluid, typically water, at the high temperature and pressure is highly corrosive and the portion of the vessel in contact with the fluid must be composed of corrosion-resistant material such as stainless steel, Monel metal or Inconel metal. Corrosion-resistant material does not have adequate strength and in addition is highly costly. The vessel for containing the fluid is then composed of a high-strength alloy steel internally overlaid with the corrosion-resistant material. Typical overlay practice is disclosed in Patent No. 3,257,710, granted June 28, 1966 to Francis X. Brown et al. and assigned to Westinghouse Electric Corporation.

High-power generators, for example those capable of generating 500 megawatts or 100 megawatts, require a very large vessel for containing the fluid under pressure. Typically a 500 megawatt generator requires a vessel having a diameter of about 24 feet capable of withstanding high fluid pressure. It is an object of this invention to provide such a large vessel for high-power generators or the like which shall be capable of withstanding the pressures of the fluid therein.

Such large vessels cannot be shipped completely assembled. The prevailing practice in a situation, where an object is too large to ship to the site of use, is to ship the component parts of the object to the site of use and to assemble the object at the site. But in a vessel that must be capable of withstanding high pressure, the walls are subjected to large stresses. Any component parts from which such a vessel is assembled must then be heat treated and the parts must be sealed pressure-tight against the leakage of fluid. Pressure-tight joints are produced by welding which in turn deleteriously affects the annealing. The problem of pressure sealing the parts has militated against the shipment of parts of large vessels for assembly at a remote site. It is another object of the invention to overcome this difficulty.

Attempts have been made in accordance with the teachings of the prior art to produce large vessels of the type under consideration of laminated construction. Typically attempts have been made to produce a cylindrical vessel by winding metal strip about a cylinder having a diameter equal to the internal diameter of the vessel and securing each layer of the strip by welding. The very large vessels under consideration do not lend themselves to the above-described laminated construction; but, even if the difficulties of producing the laminated vessel could be overcome, the cost would be prohibitive.

It is accordingly an object of this invention to provide a vessel, particularly a large vessel, for containing fluid at a high pressure which shall be readily constructed and the cost of which shall be minimized.

It is another object of this invention to provide such a vessel which shall readily lend itself to shipment in transportable, usually heat treated, parts from a manufacturing plant to a remote site where the vessel is to be used and to assemble as a high-pressure resistant container at the remote site.

In accordance with this invention, a vessel for large power generators is composed of a plurality of solid sections. Adjoining sections are joined by pressure-tight seals; each seal includes a plurality of relatively thin strips of material which extend generally perpendicularly to the thickness dimension of the adjoining sections along the whole length of the joint. At least one of the thin strips is metallurgically joined pressure tight to the adjoining sections; usually this strip is the innermost strip; the other strips may also be metallurgically joined.

The metallurgical joining may be carried out by arc-welding with a nonconsumable (TIG) electrode. In a typical situation for a vessel having a diameter of 24 feet, the wall thickness of the solid sections may be about 10 to 12 inches. The strips which serve to seal adjoining sections may be $\frac{1}{4}$ inch to $\frac{3}{8}$ inch thick. Because the strips are thin the strips are joined to the sections by relatively small welds which do not demand substantial heating of the material of the sections during the welding operation, and which are rapidly quenched because of the high thermal conductivity of the sections at which the welds are formed. The welding then does not disrupt the heat treatment or annealng of the sections.

In situations in which the innermost surface of the vessel has an overlay, the innermost strip which is welded to the overlay should be composed of the same material as the overlay, for example, stainless steel, Monel alloy or Inconel alloy. The remaining strips are composed of high-strength alloy steel. Alternatively the innermost layer may be composed of a material which is weld compatible (see Brown et al. patent cited above) with the overlay, and the other strips, to the extent that they are welded to the high strength material of the adjoning sections, may be composed of the high-strength alloy or of a material which is also weld compatible with the alloy.

Certain novel features considered characteristic of this invention are disclosed generally above. For a better understanding of this invention, both as to its organization and as to its method of operation, together with additional objects and advantages thereof, reference is made to the following description taken in connection with the accompanying drawings, in which:

FIG. 3 is a fragmental view enlarged of the region labeled III of FIG. 2;

FIG. 4 is a view in section taken along line IV—IV of FIG. 1;

FIG. 5 is a view similar to FIG. 4 but enlarged and with the ends of the narrow strips at the joints broken away.

Figure 1:
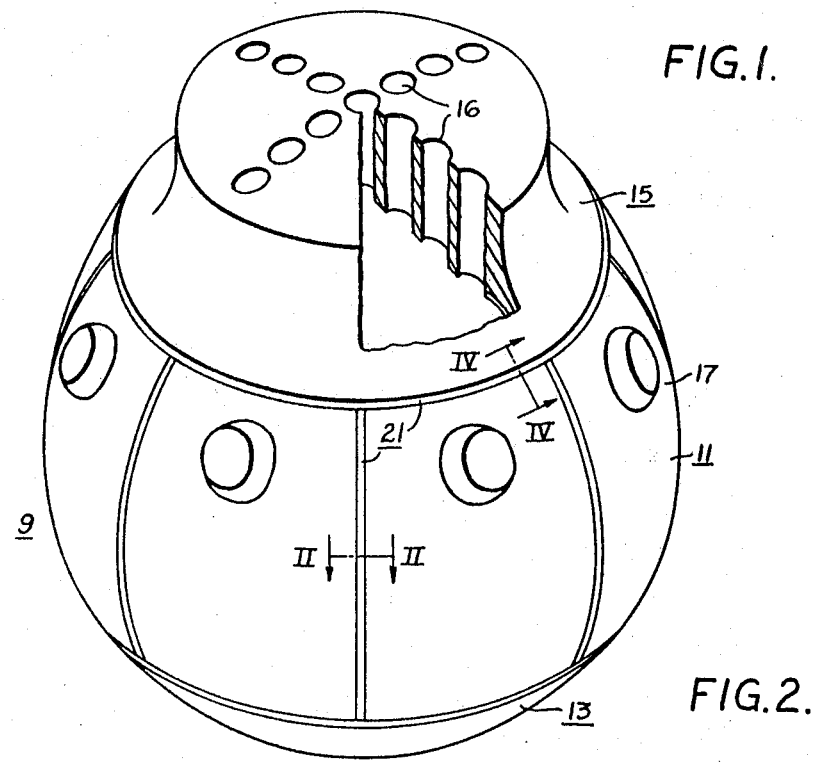
FIGURE 1 is a view in perspective of a vessel in accordance with this invention.
Figure 2:
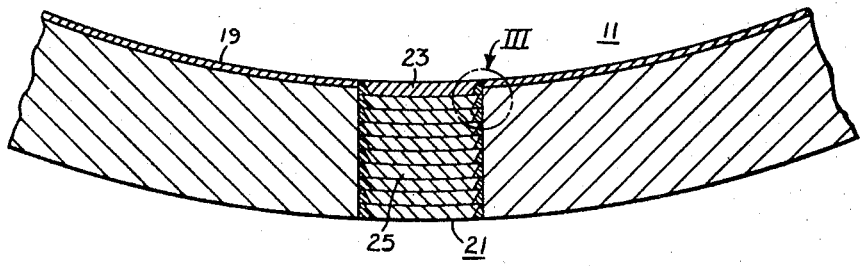
FIG. 2 is a fragmental view in section taken along line II—II of FIG. 1.

The apparatus shown in the drawings is a typical vessel 9 for a high power generator. Such a vessel may be 24 feet in diameter and may be composed of walls having a thickness of 10 inches or more. This vessel includes a side wall 11, a dome-shaped base 13 and a reinforced head region 15 which may contain one or a plurality of individual penetrations 16. The side wall is composed of a plurality of substantially solid dish-shaped sections 17, each section having a form generally similar to that of a stave of a barrel. The base 13 is in the form of a sector of a sphere. The head 15 is generally of increased radial thickness to provide reinforcement of the penetrations 16. The vessel is assembled with the side wall sections adjoining to form a generally spherical surface the ends of which are closed by the base 13 and head 15. It is essential that this vessel be pressure tight and in a typical situation be capable of withstanding a hydrostatic pressure of 3750 pounds per square inch. Each section 17 is relatively thick and is composed of solid high-strength steel and has internally an overlay 19 of corrosion-resistant alloy such as stainless steel, Monel alloy or Inconel alloy.

In accordance with this invention a pressure-tight vessel is formed by sealing the joints between adjoining sections by providing a laminated seal 21 at the jonts of adjoining sections. The laminations of the seal are relatively thin strips including an inner strip 23 and abutting outer strips 25. In producing the seal between sections 17 of the side wall 11 in a typical situation, the innermost strip 23 or lamination is first welded to the innermost portion of the contiguous side wall sections 17. The innermost strip 23 should be composed of the cladding material 19 or should be weld compatible with the cladding material. The weld deposits 27 produced to both contiguous wall sections 17 are as shown in the lower weld of FIG. 3 when first formed including the portion 29 in broken lines.

The second lamination 25 may be composed of the alloy steel of the base portion of the contiguous wall sections 17. Preparatory to inserting this second lamination, the weld deposit 27 sealing the first lamination 23 to the wall section 17 is ground so that it is substantially flush with the upper surface of the lamination 23. The portion 29 of the weld deposit 27 which is ground away is shown in broken lines in FIG. 3. The second lamination 25 is then placed on the first lamination 23 extending over the ground away portion of the weld deposit 27. The second lamination 25 may then also be welded to the contiguous sections 17 and the grinding operation repeated. The other laminations 25 which are also composed of the high strength alloy steel may be likewise disposed. While all of the laminations may in accordance with the practice of this invention be welded to the contiguous sections by pressure-tight seals, it is essential only that enough of the laminations 23 and 25 are metallurgically sealed to the contiguous walls by pressure-tight welds to assure a pressure-tight seal. In some situations only one such lamination need be sealed. Usually the innermost lamination may be so sealed but in accordance with the broader aspects of this invention any one or more of the other laminations may be sealed. In the event that only one or several of the laminations are welded pressure tight, it is essential that the others be tightly secured to each other.

In joining the base 13 or head 15 to the side wall 11 the circular seal between the head 15 or base 13 and the side wall 11 is formed by a laminated seal made up of annular strips 31 and 33 of relatively thin material. The inner annular strip 31 is joined by pressure-tight seal welds 35 which extend completely around the circular joint. The other strips 33 may also be annular and may be mounted and secured to the inner strip.

Pressure-tight seals may be provided between certain or all of these intermediate strips and the contiguous head and wall portions.

Figure 6:
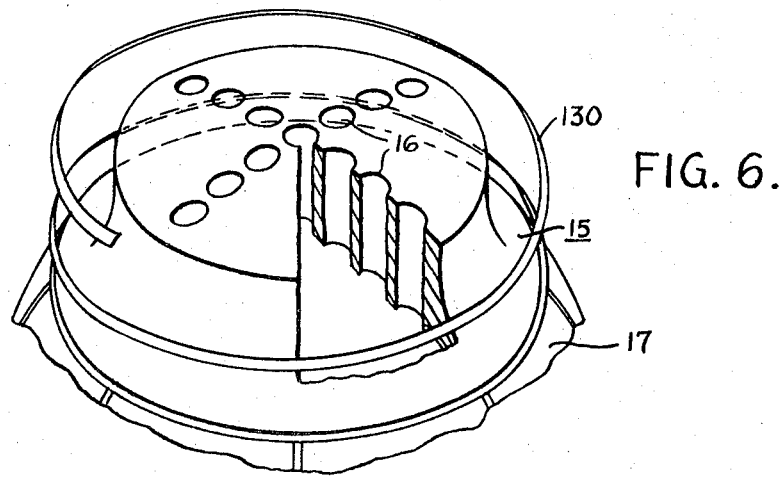
FIG. 6 is a fragmental view, with the representation of the material of the joint between sections extended showing a modification of this invention.

Alternatively the strips 31 and 33 joining the head 15 to the wall 11 or the base 13 to the wall 11 may be the turns of a strip 130 having the form of a helix. This helix is shown in FIG. 6 with its turns extended. In practice the inner turns of the helix are sealed to the inner portion of the contiguous head and wall sections and the other turns of the helix are tightly wound on the inner turn and secured to the adjoining head and wall sections. The inner winding of the helix should be composed of the cladding material or be weld-compatible with the cladding material and the outer portions should be composed of the alloy steel.

To achieve this purpose in the case of a helical seal, the alloy steel or windings may be butt welded to the cladding winding. In addition to the extent that the strip available is not sufficiently long to provide the required number of turns, the helix 130 may be formed of a number of strips butt welded.

The sectional vessel 9 here disclosed readily lends itself to construction at a site which is remote from the plant where the parts are fabricated. The sections may be readily shipped and the assembly at the site by joining the sections with laminated seal joints is readily carried out.

To facilitate understanding of this invention the following summary is presented.

This invention is a vessel 9. The principles of the invention are particularly applicable to a vessel 9 of such dimensions that it cannot be made by known prior-art methods.

An all-welded spherical reactor vessel 9 has been conceived in which the joints between dished solid sections 17 of the vessel 9 are made as laminated webs. The width of the laminations 23 and 25 or 31 and 33 in the lateral direction (the span of the gap between dished solid sections 17) is made short. The construction then is not a laminated vessel, but is a solid vessel with laminated joints.

Nozzle penetrations on the solid sections can follow conventional practice as for solid vessels. But, it is proposed, that the head 15 of this vessel 9 should also be welded to the vessel proper in the same kind of laminated strength-welded joint. Whether such joints are provided only for initial assembly and fabrication of the vessel or are provided for access to the vessel interior by cutting and rewelding is a matter of choice.

The proposed joint makes field fabrication of large vessels 9 a practical and reasonable operation. And where field fabrication is the only acceptable means, because of shipping problems, this joint construction makes possible the use of vessels 9 which would otherwise be considered prohibitively large.

The joint is made one lamination at a time beginning preferably at the inner wall 19. A lamination in the form of a uniform width strap (¼ to ⅜ inch thick) is welded at each edge to the adjacent face of the dished solid vessel sections 17. Since the weld is small (equal to the thicknesse of the lamination) no stress relief of the members is required. After the welds are made, the slag is removed, the weld face ground smooth in preparation for the succeeding lamination and the weld area is made available for dye penetrant inspection. Succeeding layers 25 are then placed until the entire joint is completed.

Straight continuous welds between major solid members can be laminated with precut lengths of lamination stock. However, at the circular joints between solid members (as between the base and the lateral walls or between the head and the lateral walls) the laminations 31 and 33 can (at the discretion of the builder) be formed as continuous helical ribbon laid down in continuous encircling progression. For the latter joints, straight ribbon stock would be roll formed to the conical shape required to laminate the gap.

It is a significant feature of this invention that the width of the lamination stock and therefore the joint width can be selected to provide an adequate working access at the bottom of the gap and also to insure an acceptable uniformity of the temperatures in the laminations. In the generation of the high-power under consideration, enormous thermal stresses of different types are produced. The thermal conductivity of the materials across the multiude of tangential interfaces between laminations is a variable and cannot be predicted, and temperature distributions in laminated vessels are of great concern. By making the laminations narrow (by making the joint gap small), thermal energy generated in the laminations can be conducted tangentially into the solid members. The proposed construction provides control of the temperatures within the laminations and is therefore not subject to the temperature uncertainties common to laminated vessels.

One of the features of the vessel 9 according to this invention is that it permits field fabrication of large heavy-walled pressure vessels because:

(a) The proposed laminated joints require that only thin (¼ to ⅜ inch thick) laminates be welded in successive layers, thus eliminating the need for field annealing. (Eliminates the need for construction of a monstrous fire brick furnace on the construction site.) The reliability of these welds is maximized because the thickness of the weld metal and therefore the heat input to the same is minimized.

(b) The width of the laminate is such that edge conduction from the laminate to the adjacent solid sections equalizes the temperatures induced by heating and maintains the same temperature gradient in the laminates that is present in the solid regions.

The vessel also permits the use of a strength weld to secure the head to the vessel and eliminates the huge forgings that would otherwise be required for bolting rings. The head can be welded in the same manner as the rest of the vessel except that strip used for the laminate can be fed continuously into the prealigned gap and automatically welded to both head and vessel in helical layers by an automatic machine that simultaneously places the laminate, welds it, back grinds the weld area and applies dye penetrant for inspection.

Removal of the head can be readily accomplished by two cut-off wheels that partially sever the outermost layer of laminate at its two weld edges, shear out the laminate in a manner very similar to opening a coffee can by a wind-up ribbon, and cut the removed laminate into disposable strips.

We claim as our invention:

1. A vessel for containing a fluid at a high pressure, the said vessel being composed of a plurality of sections of material each of substantial thickness capable of withstanding said pressure, the edges of said sections being contiguous and substantially parallel and defining narrow joints between them, each said joint between adjoining of said sections being sealed by pressure-tight seals, each seal including a plurality of strips of material extending, generally perpendicularly to the thickness dimensions of the adjoining sections, along the whole length of said last-named joint, each of said strips being thin compared to said thickness of said sections, at least one of said strips of each joint being welded pressure-tight to its contiguous sections and all strips being secured in said last-named joint, the welds of those strips which are welded in said joint being separate welds for each last-named strip.

2. The vessel of claim 1 for containing a corrosive fluid under high pressure, wherein each section has an overlay of a corrosion-resistant material on its inner surface, and wherein at least the innermost of the strips of the seal is composed of a material which is weld compatible with said corrosion-resistant material and is welded pressure tight to the overlay.

3. The vessel of claim 1 for containing a corrosive fluid under high pressure, wherein each section has an overlay of a corrosion-resistant material on its inner surface, at least the innermost of the strips of the seal composed of said corrosion-resistant material and is welded pressure tight to said overlay.

4. A vessel for containing a fluid at a high pressure, the said vessel being composed of at least two adjoining sections with the edges of said sections contiguous and substantially parallel and forming a narrow circular joint between them, the said joint being sealed by a seal composed of annular strips of material extending around the joint, each of said strips being thin compared to the thickness of said sections, at least one of said strips being welded pressure tight to the contiguous inner surfaces of said adjoining sections and all said strips being secured in said joint, the welds of those strips which are welded being separate welds for each last-named strip.

5. A pressure-tight wall composed of a pair of adjoining sections of relatively thick material, with the edges of said sections contiguous and substantially parallel and defining a narrow joint between them, the said joint between said adjoining sections being sealed by a plurality of strips of material generally perpendicular to the thickness dimension of said thick material, each of said strips being thin compared to the thickness of said sections, each strip extending along the whole length of said joint, at least one of said strips being welded pressure tight to the contiguous sides of said sections and all of said strips being secured in said joint, the welds of those strips which are welded being separate welds for each last-named strip.

6. A vessel for containing a fluid at a high pressure, the said vessel being composed of at least two adjoining sections with the edges of said sections contiguous and substantially parallel to form a narrow circular joint between them, the said joint being sealed by a seal composed of a thin continuous strip of material wound in successive turns in a tight helix in the joint with each turn extending around the joint, a least one of the turns of said helix being welded pressure tight to the contiguous inner surfaces of said adjoining sections and all turns of said helix being secured in said joint, the welds of those strips which are welded being separate welds for each last-named strip.

7. A vessel for containing a fluid at high pressure of such large dimensions that it cannot be shipped to the situs where it is to be used as a unit, said vessel having a base and head and a main body between said base and head, the main body of said vessel being composed of adjoining sections of arcuate form each subtending an angle substantially less than 180° and each capable of being shipped to said situs, the said sections extending from a region near the base of the vessel to a region near the head thereof, the edges of said sections being contiguous and substantially parallel to each other and forming joints that are narrow compared to the width of said sections, the said vessel being characterized by that each of said joints is sealed, by a plurality of strips of substantially smaller thickness than the thickness of the adjoining sections, each said strip extending along the whole length of the corresponding joint in one dimension and between said contiguous edges in the other dimension and at least one of said strips of each of the joints being welded pressure tight to said contiguous edges and all said strips being secured in said joint, the welds of those strips which are welded being separate for each last-named strip.

8. The vessel of claim 1 wherein the one strip is joined pressure-tight to the contiguous sections by small separate welds which demand no substantial heating of the contiguous sections and which are rapidly quenched because of the high thermal conductivity of the contiguous sections.

9. The vessel of claim 1 wherein the thickness of each strip is of the order of $1/40$ to $1/30$ of the thickness of the contiguous sections and the one strip is joined pressure-tight to the contiguous sections by small separate welds which demand no substantial heating of the contiguous secions and which are rapidly quenched because of the high thermal conductivity of the contiguous sections.

10. A vessel for containing a fluid at a high pressure, the said vessel being composed of at least two adjoining sections with the edges of said sections contiguous and substantially parallel to form a narrow circular joint between them, the said joint being sealed by a seal composed of a thin continuous strip of material wound in successive turns in a tight helix in the joint with each turn extending around the joint, the innermost and the outermost turns of said helix being welded to the contiguous inner surfaces of the sections, at least one of said last-named turns being welded pressure-tight to said surfaces and all turns of said helix being secured in said joint, the welds for those turns which are welded being separate welds for each last-named turn.

11. A vessel for containing a fluid at a high pressure, the said vessel being composed of at least two adjoining sections with the edges of said sections contiguous and substantially parallel to form a narrow circular joint between them, the said joint being sealed by a seal composed of a thin continuous strip of material wound in successive turns in a tight helix in the joint with each turn extending around the joint, the innermost and the outermost turns of said helix being welded to the contiguous inner surfaces of the sections, at least the innermost turn being welded pressure-tight to said surfaces and all turns being secured in said joint, the welds for those turns which are welded being separate for each last-named turn.

References Cited

UNITED STATES PATENTS

| | | |
|---|---|---|
| 1,680,276 | 8/1928 | Andrus et al. |
| 1,975,071 | 10/1934 | Black _____ 220—3 |
| 2,118,388 | 5/1938 | Zerbe _____ 220—3 |
| 2,158,799 | 5/1939 | Larson _____ 220—63 |
| 2,209,290 | 7/1940 | Watts. |
| 2,365,697 | 12/1944 | Grubb _____ 220—3 |
| 3,103,066 | 9/1963 | Harman _____ 29—471.1 |
| 3,105,808 | 10/1963 | Lawson et al. _____ 220—3 |

RAPHAEL H. SCHWARTZ, *Primary Examiner.*

U.S. Cl. X.R.

29—472.3; 220—75